US005959691A

United States Patent [19]
Koh

[11] Patent Number: 5,959,691
[45] Date of Patent: Sep. 28, 1999

[54] DIGITAL DISPLAY APPARATUS HAVING IMAGE SIZE ADJUSTMENT

[75] Inventor: Hyung-Il Koh, Suwon, Rep. of Korea

[73] Assignee: Samsung Electronics Co., Ltd., Maetan-dong, Paldal-ku, Suwon, Kyungki-do, Rep. of Korea

[21] Appl. No.: 08/891,988

[22] Filed: Jul. 14, 1997

[30] Foreign Application Priority Data

Jul. 12, 1996 [KR] Rep. of Korea ...................... 96-20736

[51] Int. Cl.[6] .......................................... H04N 9/74

[52] U.S. Cl. .......................................... 348/581; 345/99

[58] Field of Search .......................................... 348/540, 542, 348/541, 581, 792, 793, 704, 536, 543; 345/211, 213, 98, 99, 100, 127, 130, 132

[56] References Cited

U.S. PATENT DOCUMENTS

| | | | |
|---|---|---|---|
| 4,916,747 | 4/1990 | Arimoto | 382/47 |
| 4,952,923 | 8/1990 | Tamura | 340/731 |
| 5,027,036 | 6/1991 | Ikarashi et al. | 315/169.3 |
| 5,262,720 | 11/1993 | Senn et al. | 324/158 |
| 5,406,308 | 4/1995 | Shiki | 345/127 |
| 5,422,678 | 6/1995 | Takeuchi | 348/581 |
| 5,528,268 | 6/1996 | Ni et al. | 345/211 |
| 5,532,716 | 7/1996 | Sano | 345/132 |
| 5,555,002 | 9/1996 | Nguyen | 345/121 |
| 5,555,027 | 9/1996 | Takeuchi | 348/581 |
| 5,576,732 | 11/1996 | Minakuchi et al. | 345/127 |
| 5,790,200 | 9/1995 | Tsujimoto et al. | 348/545 |

*Primary Examiner*—Andrew I. Faile
*Assistant Examiner*—Alexander Berhe
*Attorney, Agent, or Firm*—Robert E. Bushnell, Esq.

[57] ABSTRACT

A digital display apparatus capable of adjusting the vertical size of the display image includes a PLL circuit and a frequency divider. The output voltage level of an active low-pass filter in the PLL circuit is changed if the power voltage supplied to the filter is varied, resulting in the frequency variation of the dot clock signal even though there is no variation in the frequency of the horizontal synchronizing signal. Thus, the adjustment of the vertical size of the display image is easily achieved by controlling a voltage supplied to the low-pass filter in the PLL circuit.

9 Claims, 2 Drawing Sheets

DIGITAL DISPLAY APPARATUS HAVING IMAGE SIZE ADJUSTMENT

CLAIM OF PRIORITY

This application makes reference to, incorporates the same herein, and claims all benefits accruing under 35 U.S.C. § 119 from an application for *A DIGITAL DISPLAY APPARATUS HAVING IMAGE SIZE ADJUSTMENT* earlier filed in the Korean Industrial Property Office on the 12th day of July 1996 and there duly assigned Serial No. 20736/1996, a copy of which application is annexed hereto.

BACKGROUND OF THE INVENTION

1. Field of the Invention

The present invention relates to a digital display apparatus, and more particularly to a flat display apparatus capable of adjusting the vertical size of the display image.

2. Description of the Related Art

In analog display apparatus using Cathode Ray Tubes (CRTs), the adjustment of the horizontal size and vertical size of the display image has been performed by the deflection control that controls the amount of currents flowing through the horizontal and vertical deflection yokes provided around the neck of the CRT.

However, as for so-called flat panel display apparatus driven by digital video signals, such as plasma displays (PDPs), liquid crystal displays (LCDs), and so on, the display image size adjustment through the conventional method is impossible. Thus, in order to adjust the size of the image in a digital display apparatus, it is necessary to process the digital video signals through a digital data conversion.

The patents to Takeuchi, U.S. Pat. Nos. 5,422,678 and 5,555,027, respectively entitled *Video Processor For Enlarging And Contracting An Image In A Vertical Direction* and *VIDEO PROCESSOR FOR ENLARGING AND CONTRACTING AN IMAGE IN A VERTICAL DIRECTION*, disclose a video processor which is capable of arbitrarily expanding or contracting an image in a vertical direction. However, the system of Takeuchi requires programmable frequency dividers as well as a video memory in order to effect the adjustment of the size in a vertical direction.

The following patents each disclose features in common with the present invention but are not as pertinent as the Takeuchi patents noted above: U.S. Pat. No. 5,262,720 to Senn et al., entitled *Circuit For Controlling The Lines Of A Display Screen And Including Test Means With A Single Output*, U.S. Pat. No. 5,528,268 to Ni et al., entitled *Control Method And Device For A Monitor*, U.S. Pat. No. 5,027,036 to Ikarashi et al., entitled *Drive Circuit For An Electroluminescence Display Device*, U.S. Pat. No. 5,532,716 to Sano, entitled *Resolution Conversion System*, U.S. Pat. No. 5,555,002 to Nguyen, entitled *Method And Display Control System For Panning*, U.S. Pat. No. 5,576,732 to Minakuchi et al., entitled *Dynamic Image Display Device*, U.S. Pat. No. 5,406,308 to Shiki, entitled *Apparatus For Driving Liquid Crystal Display Panel For Different Size Images*, U.S. Pat. No. 4,916,747 to Arimoto, entitled *Image Processing System,* and U.S. Pat. No. 4,952,923 to Tamura, entitled *Display Apparatus With Image Expanding Capability.*

SUMMARY OF THE INVENTION

It is therefore the object of the present invention to provide a digital display apparatus that can easily adjust the vertical size of the display image without digital data conversion.

According to an aspect of the present invention, there is provided a digital display apparatus having a display panel, for receiving a horizontal synchronizing signal and an analog video signal synchronized with the horizontal synchronizing signal from a host and for displaying an image on a screen of the display panel, the apparatus comprising a pulse generation circuit responsive to the horizontal synchronizing signal for generating a first pulse signal of a first frequency higher than the frequency of horizontal synchronizing signal; a frequency division circuit responsive to the first pulse signal for generating a second pulse signal of a second frequency being one n-th of the first frequency, where n is a positive integer; an analog-to-digital conversion circuit for converting the analog video signal into a digital video signal in synchronism with the first pulse signal; a display drive circuit for receiving the digital video signal in synchronism with first pulse signal and for driving the display panel by means of the digital video signal in synchronism with the first and second pulse signals; and a frequency variation circuit for varying the first frequency of the first pulse signal independent of the horizontal synchronizing signal by controlling a voltage supplied to the pulse generation circuit.

The adjustment of the vertical size of the display image is easily achieved by controlling the voltage supplied to the pulse generation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

It should be understood that the description of this preferred embodiment is merely illustrative and that it should not be taken in a limiting sense. In the following detailed description, several specific details are set forth in order to provide a thorough understanding of the present invention. It will be obvious, however, to one skilled in the art that the present invention may be practiced without these specific details.

Figure 1:
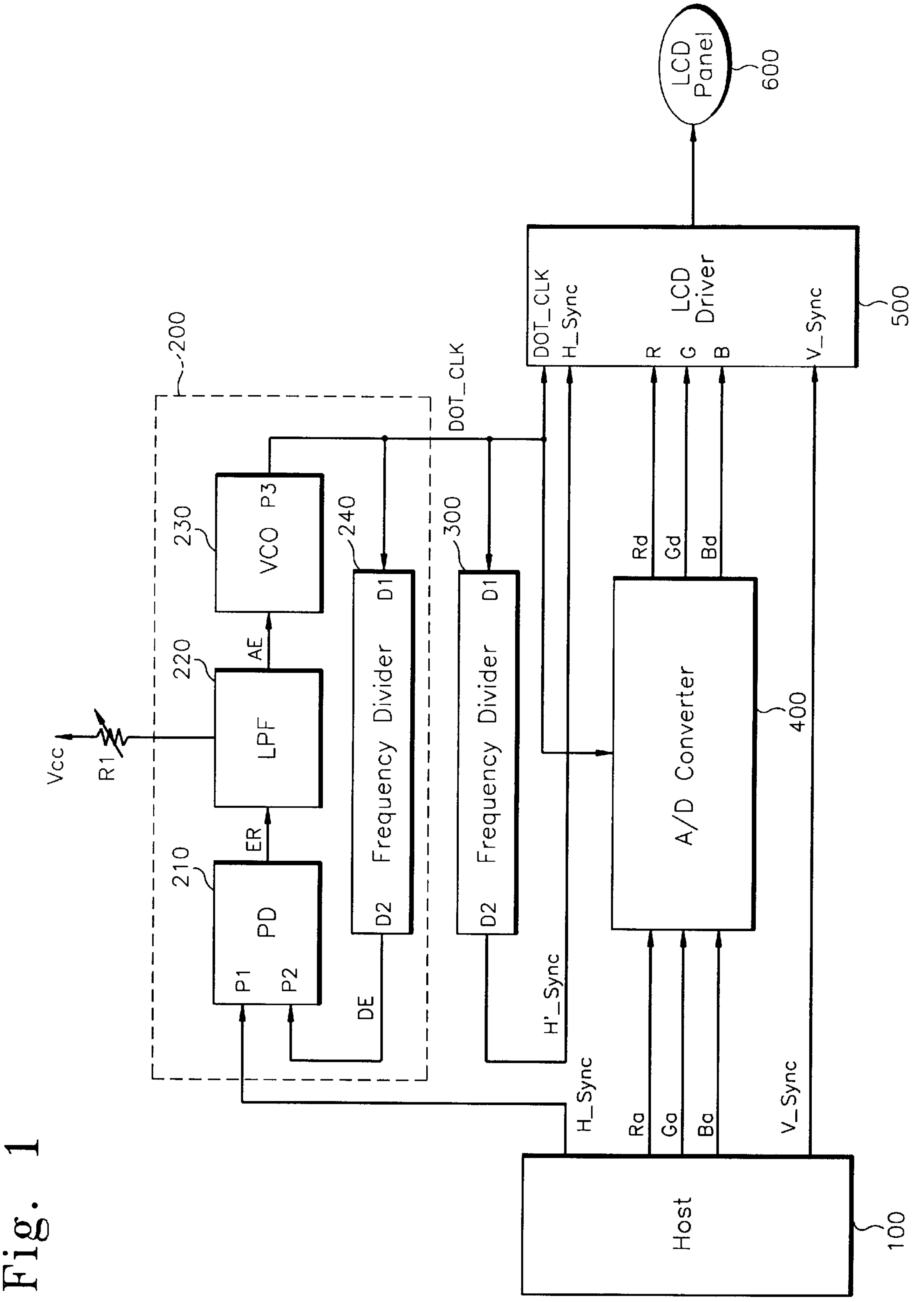
FIG. 1 shows a digital display apparatus according to an embodiment of the present invention.

Referring to FIG. 1, the novel display apparatus is fed with horizontal and vertical synchronizing signals H_Sync and V_Sync and analog video signals Ra, Ga, and Ba from a host 100. A phase-locked loop (PLL) circuit 200 is supplied with the horizontal synchronizing signal H_Sync from the host (e.g., a computer) 100 and generates a dot clock signal DOT_CLK whose frequency is higher than that of the horizontal synchronizing signal (referred to as an external horizontal synchronizing signal) H_Sync. A frequency divider 300 is provided for the LCD apparatus according to this embodiment. The frequency divider 300 receives the dot clock signal DOT__CLK from the PLL circuit 200 and generates another horizontal synchronizing signal (referred to as an internal horizontal synchronizing signal) H'__Sync whose frequency is one n-th of the frequency of the dot clock signal DOT__CLK, where n is a positive integer. The frequency of the dot clock signal DOT__CLK is independent of the external horizontal synchronizing signal H__Sync by controlling a voltage supplied to the PLL circuit 200. An LCD driver 500 is provided to drive an LCD panel 600 in synchronism with the dot clock signal DOT__CLK, the internal horizontal synchronizing signal H'Sync and the vertical synchronizing signal V__Sync.

In this embodiment, the output voltage level of an active low-pass filter 220 in the PLL circuit 200 is changed if the voltage supplied to the filter 220 is varied. This results in the frequency variation of the dot clock signal DOT__CLK even though there is no variation in the frequency of the external horizontal synchronizing signal H__Sync. Thus, the adjustment of the vertical size of the display image is easily achieved by controlling a voltage supplied to the low-pass filter 220 in the PLL circuit 200.

Returning to FIG. 1, the PLL circuit 200, which serves as a pulse generation circuit to generate a pulse signal DOT__CLK in response to the external horizontal synchronizing signal H__Sync from the host 100, includes a phase comparator (or a phase detector PD) 210, an active lowpass filter 220, a voltage-controlled oscillator (VCO) 230 and a programmable frequency divider 240. The phase comparator has two input terminals and one output terminal. The external horizontal synchronizing signal H__Sync and the output pulse signal of the programmable frequency divider 240 are respectively fed to the input terminals of the phase comparator 210. The phase comparator 210 generates an error signal ER of a voltage level proportional to a phase difference between the external horizontal synchronizing signal H__Sync and the output pulse signal DE of the programmable frequency divider 240. The voltage level of the error signal ER becomes maximum when the phase difference is 0 degree, while it becomes minimum when the phase difference is 180 degrees. The frequency divider 240 is programmed to output its output pulse signal DE whose frequency is equal to that of the external horizontal synchronizing signal H__Sync. The active low-pass filter 220 generates an average error signal AE having an average voltage level of the error signal ER from the phase comparator 210. The VCO 230 produces the dot clock signal DOT__CLK in response to the average error signal AE. The programmable frequency divider 240 is fed with the dot clock signal DOT__CLK from the VCO 230 and generates the output pulse signal DE which has the same frequency as the external horizontal synchronizing signal H__Sync.

The frequency divider 300 is programmed to have a frequency division rate of n, where n is positive integer. The divider 300 is provided to generate the internal horizontal synchronizing signal H'__Sync in response to the dot clock signal DOT__CLK.

An analog-to-digital (A/D) converter 400 is fed with analog video data signals Ra, Ga and Ba from the host 100. The A/D converter 400 converts the analog video signals Ra, Ga and Ba into digital video signals (or video data) Rd, Gd and Bd in synchronism with the dot clock signal DOT__CLK from the PLL 200. The LCD driver 500 receives digital video data Rd, Gd and Bd from the A/D converter 400 in synchronism with the dot clock signal DOT__CLK, and drives the LCD panel 600 by means of the video data Rd, Gd and Bd, in synchronism with the internal horizontal synchronizing signal H'__Sync from the frequency divider 300 and the vertical synchronizing signal V__Sync from the host 100.

Figure 2:
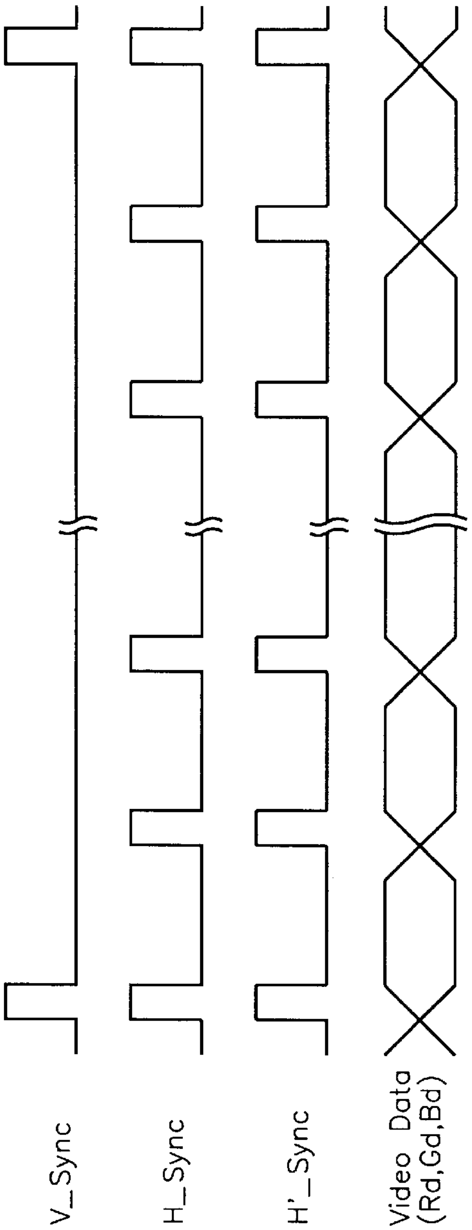
FIG. 2 is a timing diagram showing the sampling frequency of video data in the case where the frequency of the horizontal synchronizing signal is equal to that of the output signal of the frequency divider shown in FIG. 1.

FIG. 2 is a timing diagram showing the sampling frequency of video data in the case where the frequency of the external horizontal synchronizing signal H__Sync supplied from the host 100 is equal to that of the internal horizontal synchronizing signal H'__Sync fed from the frequency divider 300, shown in FIG. 1. The LCD panel 600 is driven by the video data Rd, Gd and Bd in synchronism with the vertical synchronizing signal V Sync and the internal horizontal synchronizing signal H'__Sync from the LCD driver 500. As shown in the figure, the output pulse signal DOT__CLK of the PLL circuit 200 is phase locked to the external horizontal synchronizing signal H__Sync.

Referring back to FIG. 1, a variable resistor R1 is provided for the display apparatus of this embodiment. The variable resistor R1 is connected between the active low-pass filter 220 and a power source for supplying a voltage Vcc to the filter 220. The function of the variable resistor R1 is to control the voltage level of the average error signal AE outputted from the active low-pass filter 220. As a result, the resistor R1 serves as a frequency variation circuit for varying the frequency of the dot clock signal DOT__CLK independent of the external horizontal synchronizing signal H__Sync by controlling a voltage supplied to the filter 220 in the PLL 200.

As is well-known, the low-pass filter 220 includes at least one operational amplifier (not shown). The resistor R1 is just connected to a power input terminal of the operational amplifier. The output voltage level of the amplifier, i.e., the voltage level of the average error signal AE outputted from the low-pass filter 220 is decreased if the resistance of the variable resistor R1 is increased. The output voltage level of the amplifier is increased if the resistance of the variable resistor R1 is decreased. This resistance variation of the resistor R1 results in the frequency variation of the dot clock signal DOT__CLK fed from the VCO 230.

When the resistance of the resistor R1 is adjusted, the frequency divider 240 is newly programmed to output its output pulse signal DE of which frequency is equal to that of the external horizontal synchronizing signal H__Sync, but the driver 300 is not programmed again. Thus, the frequency of the internal horizontal synchronizing signal H'__Sync is different from that of the external horizontal synchronizing signal H__Sync.

Figure 3:
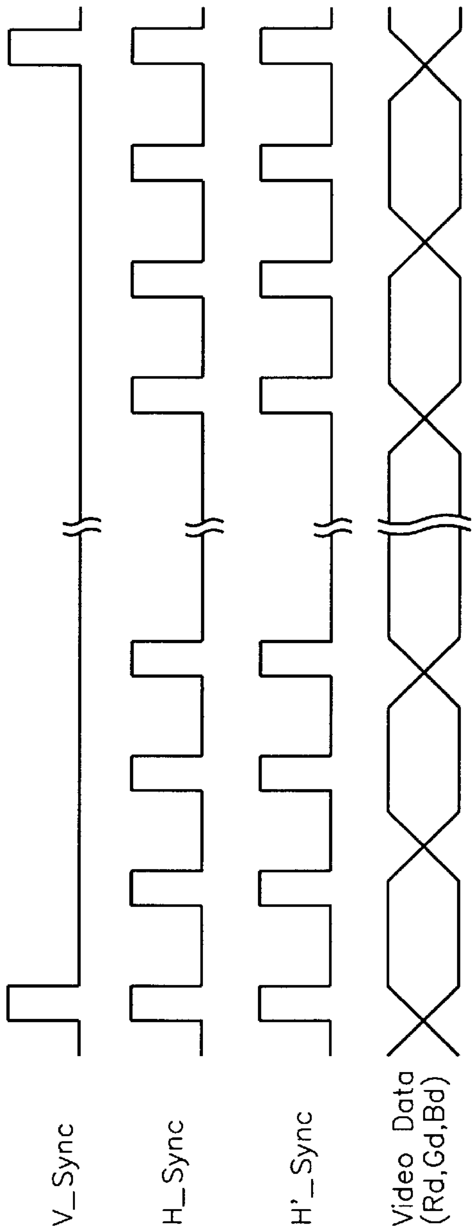
FIG. 3 is a timing diagram showing the sampling frequency of video data in the case where the frequency of the output signal of the frequency divider shown in FIG. 1 is higher than that of the horizontal synchronizing signal.

In FIG. 3, there is illustrated a timing diagram, which shows the sampling frequency of video data, in the case where the frequency of the internal horizontal synchronizing signal H'__Sync is higher than that of the external horizontal synchronizing signal H__Sync. Referring to FIG. 3, the sampling frequency of the video data is higher than that in FIG. 2. This means the number of horizontal lines on the screen is increased.

As described above, the frequency of the internal horizontal synchronizing signal H'__Sync is higher or lower than that of the external horizontal synchronizing signal H__Sync if the resistance of the resistor R1 is changed. Namely, the number of horizontal lines on the display screen is increased or decreased. Consequently, the adjustment of the vertical size is achieved by varying the resistance of the variable resistor R1.

In a modification of this embodiment, a potentiometer may be used instead of the variable resistor R1 for performing the frequency variation function. In this case, a first terminal of the potentiometer is connected to a power source for supplying the voltage to the low-pass filter 220, a second terminal thereof is grounded, and a third terminal, being a voltage division terminal, is connected to a power input terminal of the low-pass filter 220. The adjustment of the vertical size can be achieved by adjusting the voltage division terminal of the potentiometer. Also, in another modification of this embodiment, another PLL circuit may be used instead of the frequency divider 300.

According to this invention, the adjustment of the vertical size can be easily preformed without a digital data conversion.

While the invention has been described in terms of an exemplary embodiment, it is contemplated that it may be practiced as outlined above with modifications within the spirit and scope of the appended claims.

What is claimed is:

1. A digital display apparatus having a display panel, for receiving a horizontal synchronizing signal of a predetermined frequency and an analog video signal synchronized with said horizontal synchronizing signal from a host and for displaying an image on a screen of said display panel, said apparatus comprising:

a pulse generator responsive to said horizontal synchronizing signal for generating a first pulse signal of a first frequency higher than the frequency of said horizontal synchronizing signal;

a frequency divider responsive to said first pulse signal for generating a second pulse signal of a second frequency which is one n-th of said first frequency, where n is a positive integer;

an analog-to-digital converter for converting said analog video signal into a digital video signal in synchronism with said first pulse signal;

a display driver for receiving said digital video signal in synchronism with said first pulse signal and for driving said display panel by means of said digital video signal in synchronism with said first and second pulse signals; and a frequency variation means for varying the first frequency of said first pulse signal independent of said horizontal synchronizing signal by controlling a voltage supplied to said pulse generator.

2. The digital display apparatus of claim 1, said pulse generator comprising: a programmable frequency divider responsive to said first pulse signal for generating a third pulse signal of a frequency equal to the frequency of said horizontal synchronizing signal; a phase comparator for generating an error signal of a voltage level proportional to a phase difference between said horizontal synchronizing signal and said third pulse signal, an active low-pass filter for generating an average error signal having an average voltage level of said error signal, and a voltage-controlled oscillator responsive to said average error signal for generating said first pulse signal.

3. The digital display apparatus of claim 2, said frequency variation means comprising a variable resistor connected between said low-pass filter and a power source for supplying the voltage to said low-pass filter, the voltage level of said average error signal being controlled by adjusting a resistance of said variable resistor.

4. The digital display apparatus of claim 2, said frequency variation means comprising a potentiometer having a first terminal connected to a power source for supplying said voltage to said low-pass filter, a second terminal being grounded and a third movable terminal connected to a power input terminal of said low-pass filter, the voltage level of said average error signal being controlled by adjusting the movable terminal of said potentiometer.

5. The digital display apparatus of claim 1, said display panel being a liquid crystal display panel.

6. A digital display apparatus having a display panel, for receiving a horizontal synchronizing signal of a predetermined frequency and an analog video signal synchronized with said horizontal synchronizing signal from a host and for displaying an image on a screen of said display panel, said apparatus comprising:

a phase-locked loop circuit including a frequency variation means, responsive to said horizontal synchronizing signal for generating a pulse signal of a first frequency higher than the frequency of said horizontal synchronizing signal, said frequency variation means varying the first frequency independent of said horizontal synchronizing signal by controlling a voltage supplied to said pulse generator;

a frequency divider responsive to said first pulse signal for generating a second pulse signal of a second frequency which is one n-th of said first frequency, where n is a positive integer;

an analog-to-digital converter for converting said analog video signal into a digital video signal in synchronism with said first pulse signal; and a display driver for receiving said digital video signal in synchronism with said first pulse signal and for driving said display means by means of said digital video signal in synchronism with said first and second pulse signals.

7. A digital display apparatus of claim 6, said phase-locked loop circuit comprising a programmable frequency divider responsive to said first pulse signal for generating a third pulse signal of a frequency equal to the frequency of said horizontal synchronizing signal; a phase comparator for generating an error signal of a voltage level proportional to a phase difference between said horizontal synchronizing signal and said third pulse signal, an active low-pass filter for generating an average error signal having an average voltage level of said error signal, and a voltage-controlled oscillator responsive to said average error signal for generating said first pulse signal.

8. The digital display apparatus of claim 7, said frequency variation means comprising a variable resistor connected between said low-pass filter and a power source for supplying the voltage to said low-pass filter, the voltage level of said average error signal being controlled by adjusting a resistance of said variable resistor.

9. The digital display apparatus of claim 7, said frequency variation means comprising a variable voltage connected to said low-pass filter for supplying the voltage to said low-pass filter, the voltage level of said average error signal being controlled by adjusting said variable voltage supplied to said low-pass filter.

* * * * *